US010478792B2

(12) United States Patent
Nascimento et al.

(10) Patent No.: US 10,478,792 B2
(45) Date of Patent: Nov. 19, 2019

(54) CYLINDRICAL WALL FOR FILTERING SOLID PARTICLES IN A FLUID

(71) Applicant: TOTAL RAFFINAGE CHIMIE, Courbevoie (FR)

(72) Inventors: Pedro Nascimento, Le Havre (FR); Arnaud Selmen, Le Havre (FR); Renaud Belin, Fontenay (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

(21) Appl. No.: 16/334,791

(22) PCT Filed: Sep. 18, 2017

(86) PCT No.: PCT/EP2017/073474
§ 371 (c)(1),
(2) Date: Mar. 20, 2019

(87) PCT Pub. No.: WO2018/054838
PCT Pub. Date: Mar. 29, 2018

(65) Prior Publication Data
US 2019/0232245 A1 Aug. 1, 2019

(30) Foreign Application Priority Data

Sep. 20, 2016 (FR) ...................................... 16 58813

(51) Int. Cl.
*B01J 8/02* (2006.01)
(52) U.S. Cl.
CPC ........... *B01J 8/0214* (2013.01); *B01J 8/0278* (2013.01); *B01J 2208/00814* (2013.01); *B01J 2208/00884* (2013.01)
(58) Field of Classification Search
CPC .................... B01J 8/0214; B01J 8/0278; B01J 2208/00884; B01J 2208/00814
(Continued)

(56) References Cited

U.S. PATENT DOCUMENTS 5,118,419 A * 6/1992 Evans .................... B01J 8/0214
                                                              210/291
6,184,326 B1 2/2001 Razavi et al.
(Continued)

FOREIGN PATENT DOCUMENTS

EP 1495861 A1 1/2005
WO 0011078 A1 3/2000
(Continued)

OTHER PUBLICATIONS

International Search Report issued in Application No. PCT/EP2017/071822, dated Dec. 18, 2017, 4 pages.
(Continued)

*Primary Examiner* — Huy Tram Nguyen
(74) *Attorney, Agent, or Firm* — Albert Shung

(57) ABSTRACT

A cylindrical wall (100) for filtering solid particles in a fluid, through which this fluid is likely to circulate, this wall comprising:
  a perforated cylinder (30) being produced from at least one perforated plate,
  a grating assembly (110), of generally cylindrical form, intended to be in contact with the solid particles, the grating assembly and the perforated cylinder being concentric, the grating assembly comprising at least one grating element (113), said grating element comprising a plurality of wires (111),
  means for assembling said at least one grating element so as to form the grating assembly of generally cylindrical form, said assembly means being arranged to ensure a fixing of said at least one grating element on the perforated plate that can be dismantled.

13 Claims, 3 Drawing Sheets

Figure 1:
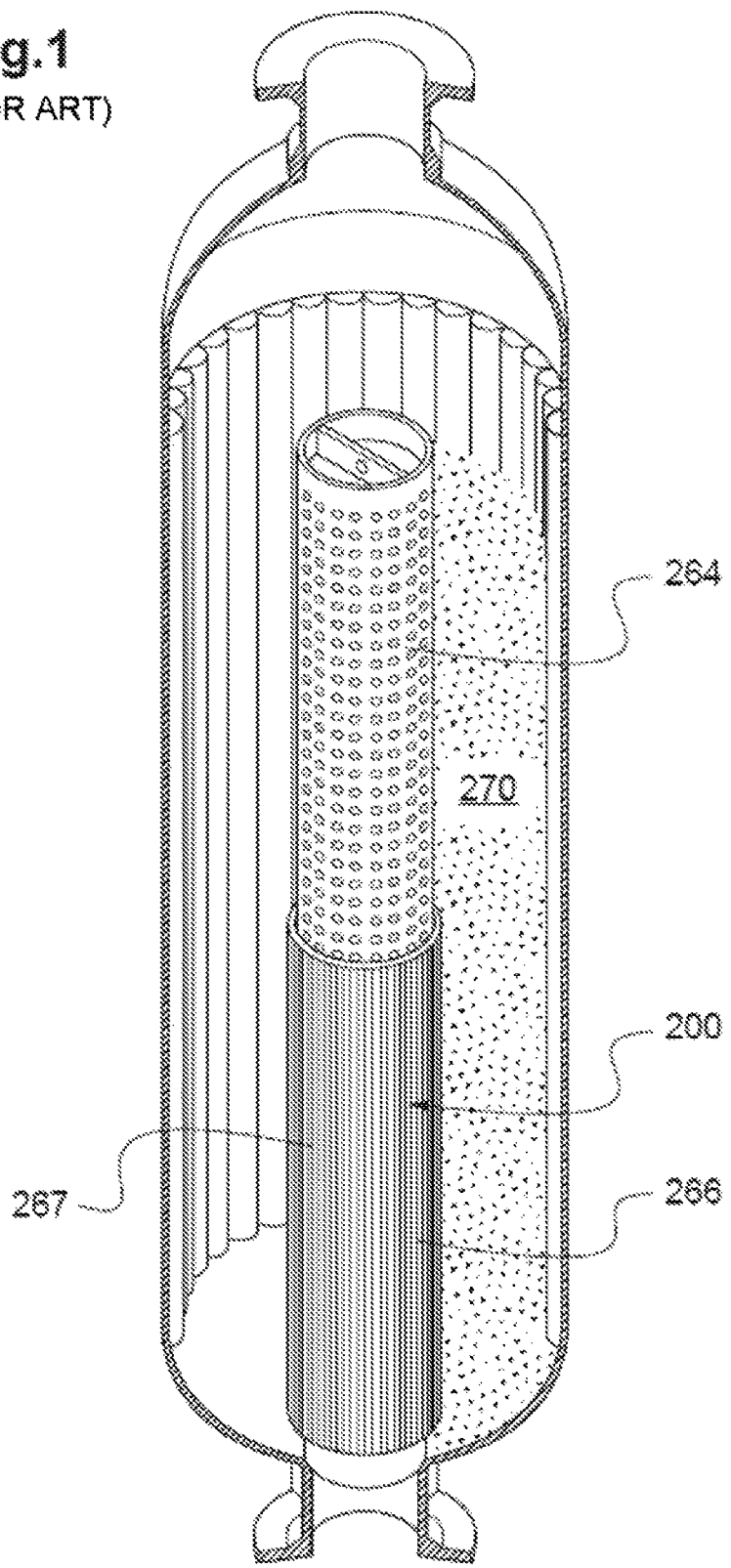

(58) Field of Classification Search
USPC .......................................................... 422/187
See application file for complete search history.

(56) References Cited

U.S. PATENT DOCUMENTS

| | | | |
|---|---|---|---|
| 6,221,320 B1* | 4/2001 | Nagaoka | B01J 8/0207 422/181 |
| 6,407,171 B1 | 6/2002 | Agarwal et al. | |
| 2005/0142367 A1 | 6/2005 | Su et al. | |
| 2016/0256812 A1* | 9/2016 | Bazer-Bachi | B01D 46/2403 |

FOREIGN PATENT DOCUMENTS

| | | |
|---|---|---|
| WO | 2004022336 A1 | 3/2004 |
| WO | 2012001160 A2 | 1/2012 |

OTHER PUBLICATIONS

H.N. Cheng, J. Ewen, Makromol. Chem., vol. 190, 1989, p. 1931-1940.
A. Razavi, Macromol. Symp., vol. 89, pp. 345-367.
G.J. Ray et al. in Macromolecules, vol. 10, n° 4, 1977, p. 773-778.
F. Pradel et al., "A New Concept of Scallops Screens for Reactors of Refining", Oil and Gas Science and Technology, vol. 56 (2001), No. 6, pp. 597-610.

* cited by examiner

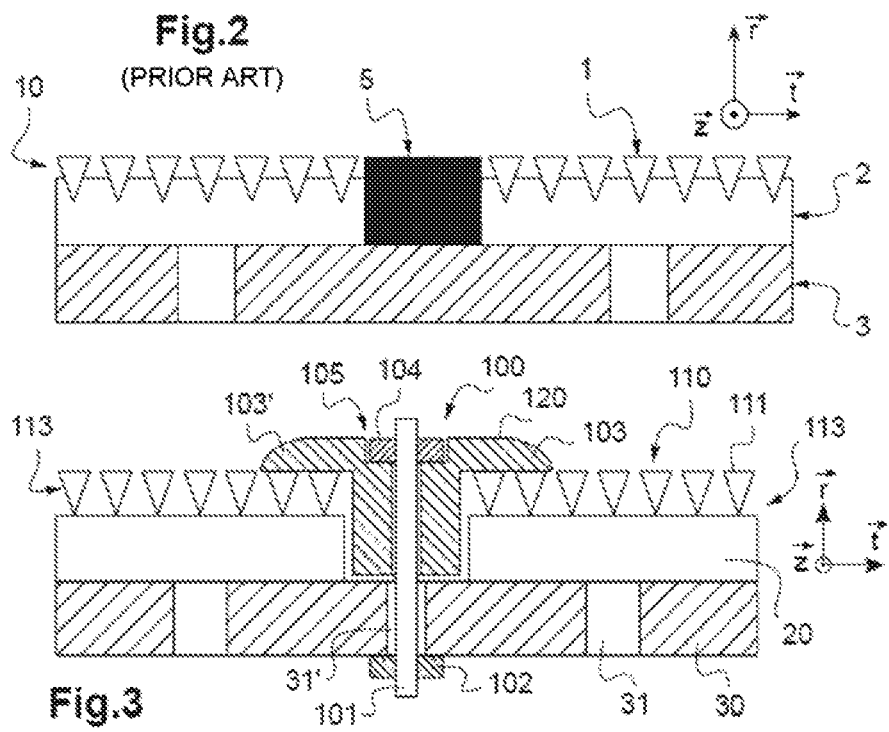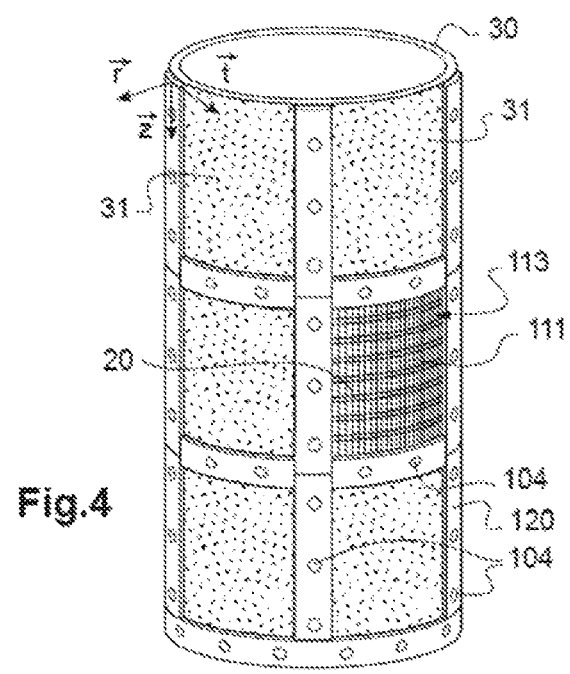

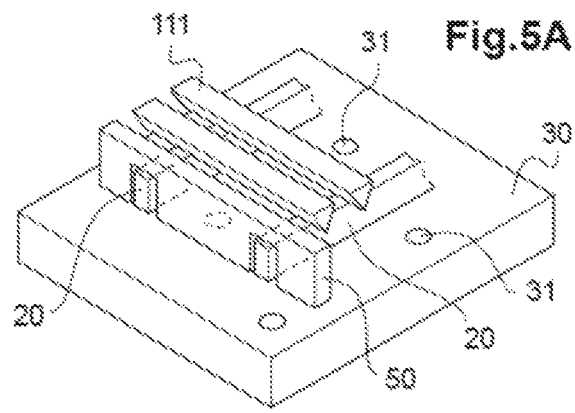
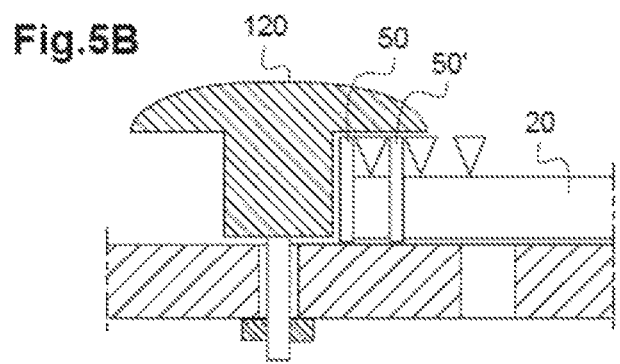
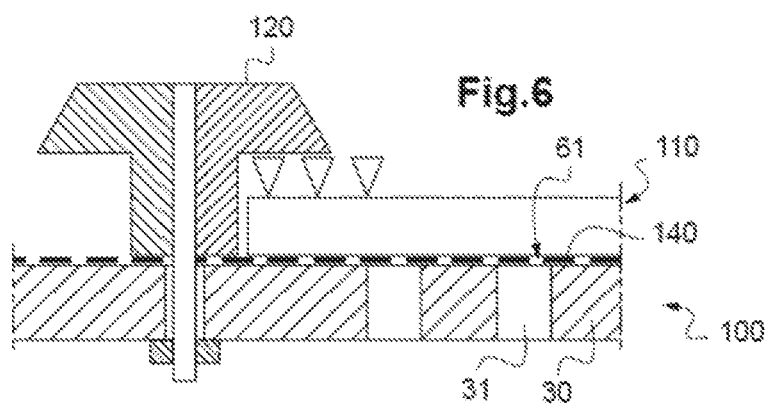

CYLINDRICAL WALL FOR FILTERING SOLID PARTICLES IN A FLUID

CROSS-REFERENCE TO RELATED APPLICATIONS

This application claims the benefit of PCT/EP2017/073474 filed Sep. 18, 2017, which claims priority from FR 1658813 filed Sep. 20, 2016, which are incorporated herein by reference in their entireties for all purposes.

The invention relates to a cylindrical wall for filtering solid particles in a fluid, for example a radial flow catalyst bed wall. The invention can be applied for example in catalytic reformers, in reforming regenerators, in the context of other dehydrogenation transformation methods, and more generally in the context of any method for filtering solid particles in a fluid by means of a cylindrical wall.

The documents U.S. Pat. Nos. 3,167,399, 2,997,374 and the article by F. Pradel et al., (2001) "A New Concept of Scallops Screens for Reactors of Refining", published in the Oil and Gas Science and Technology journal, describe examples of radial flow reactors.

This type of reactor can for example be used in catalytic reforming units, in other dehydrogenation transformation units, or even in catalytic reforming regenerator units.

Catalytic reforming makes it possible to convert naphtha molecules into aromatic molecules having a higher octane index for the purposes of obtaining motor vehicle fuel.

The reforming can be regenerative or semi-regenerative. In the case of regenerative reforming, catalyst can circulate between concentric cylindrical walls of a radial flow catalyst bed. In the case of semi-regenerative reforming, the catalyst is simply contained in the annular space defined by the concentric walls.

FIG. 1 shows an example catalytic reformer according to the prior art. A radial flow catalyst bed cylindrical wall 200 conventionally comprises a perforated plate 264 forming a cylindrical element and a grating 266 forming another cylindrical element, these cylindrical elements being concentric. The grating 266 is intended to be in contact with the fluid in which the catalyst 270 bathes (the fluid and the catalyst being represented on only a part of the reformer in FIG. 1) and comprises flats (not visible in FIG. 1) each extending in a tangential direction and arranged at various heights and wires 267 extending vertically and secured to the flats.

A center pipe wall comprises the perforated plate which ensures a mechanical strength. The grating participates in the retention of the catalyst in the annular space.

In order for the grating to form a cylindrical element, all of the ends of flats are secured to the perforated plate by means of a vertical weld seam (not represented in FIG. 1). This weld seam prevents the passage of catalyst to the perforated plate.

Nevertheless, the weld can be subject to relatively high mechanical stresses, in particular by thermal expansion in cases of unscheduled shutdowns of the unit or during restarting phases following these unscheduled shutdowns. If there is a break in the weld, a passage can be created for the catalyst to the perforated plate. This results in a loss of containment of the catalyst outside of the reactor.

It is then recommended practice to repair this link with a new weld bead. That nevertheless requires a shutdown of the reactor and therefore of all of the unit.

The aim is to avoid or at the very least limit the shutdowns of reactors. In effect, the shutdown of a unit of a refinery can result in relatively significant losses of earnings.

The documents WO 01/66239 and US 2008/0107575 describe outer basket walls, produced from several hollow longitudinal ducts, each corresponding to an angular range.

Also known are systems without grating, involving a structure with louvers, as for example in the document WO 2012/044594.

There is a need for a cylindrical wall for filtering solid particles that makes it possible to reconcile simplicity and reliability.

There is proposed a cylindrical wall for filtering solid particles in a fluid, through which this fluid is likely to circulate, this wall comprising:
  a perforated cylinder extending in a longitudinal direction, this cylinder being produced from at least one perforated plate,
  a grating assembly, of generally cylindrical form, intended to be in contact with the solid particles, the grating assembly and the perforated cylinder being concentric, the grating assembly comprising at least one grating element, this element comprising a plurality of wires each extending in a longitudinal direction and arranged adjacent to one another in order to allow the fluid to circulate between the wires while filtering the solid particles,
  means for assembling said at least one grating element in order to form the grating assembly, these assembly means being arranged to ensure a fixing of said at least one grating element on the perforated plate that can be dismantled.

Thus, a structure of concentric cylinders is retained, that is simpler to design and manufacture than the structures with longitudinal ducts and the structures with louvers, and this is done while limiting the mechanical stresses, which, in the case of an application to reactors, makes it possible to limit the shutdowns of reactors compared to the walls of the prior art in which the longitudinal weld is subjected to the loads associated with the expansions of the grating cylinder and with the expansion of the perforated cylinder. Since the cylinders are likely to be produced in different materials, these expansions can, in the prior art, result in lifting or shearing forces.

Thus, the wall described above can prove more robust than the walls with a weld of the type known from the prior art, and, in addition, maintenance is simplified.

"A plurality of wires" is understood to mean a number of wires preferably greater than five, advantageously greater than ten or twenty.

In one embodiment, the grating assembly can further comprise a plurality of flats spaced apart from one another in the longitudinal direction and each extending tangentially and secured to the wires.

The wires can for example be welded to the flats, even though the invention is not limited to this embodiment.

The invention is in no way limited to the presence of a plurality of flats. Thus, in another embodiment, the wires can be secured to one another, each wire being secured to its neighbors on either side by localized links. Such a grating element without flats can be obtained by 3D printing for example.

Advantageously, the wall can further comprise sealing means arranged to block, on an end edge of at least one grating element, a flow passage between this grating element and the perforated plate.

The sealing means can make it possible to avoid losses of containment likely to occur in the absence of a longitudinal weld securing the grating assembly to the perforated cylinder, of the type known from the prior art.

The sealing means can make it possible to prevent the passage of solid particles into the space between the grating assembly and the perforated cylinder at the end edges of the grating elements. In particular, the sealing means make it possible to prevent the passage of solid particles between the wires and the perforated cylinder.

The sealing means can for example comprise:
one or more sealing plates extending in the longitudinal direction over at least a part, and advantageously all, of the length of the grating cylinder, these plates being arranged on the end edges of the grating elements in order to prevent the passage of solid particles between the wires and the perforated plate; if appropriate, these plates can extend radially over a thickness close to, or equal to, that of the flats or of the thickest wires, and/or
one or more of the covering plates extending so as to cover two end edges of two adjacent grating elements, or, in the case where the grating assembly comprises a single grating element, between the two end edges of this grating element. This covering plate thus makes it possible to block the passage to the perforated plate further downstream than the sealing plates.

The assembly means can advantageously be arranged to ensure a rigid assembly.

In one embodiment, it is possible to provide a single grating element for the grating assembly, but, advantageously, the grating assembly can comprise several grating elements.

Each grating element extends longitudinally and tangentially.

The assembly means can make it possible to assemble:
grating elements each extending tangentially so as to occupy an angular range strictly less than 360°, advantageously less than or equal to 180°, for example an angular range slightly less than 180° when there are two grating elements at a given height; the assembly means can then comprise, for example, a portion extending in the longitudinal direction, or even several localized assembly elements spaced apart from one another in the longitudinal direction, and/or
grating elements each extending longitudinally so as to occupy only a portion of the height of the grating cylinder; the assembly means can then comprise, for example, a portion having a generally circular arc or circular form, or even several localized assembly elements arranged in a circular arc.

When several grating elements are thus provided, it is possible to manufacture the grating assembly by segments, and, if appropriate, to replace the grating elements independently of one another. For example, if a grating elements proves to have failed, it can be removed and replaced by a functional grating element, and this can be done while leaving the other grating elements unchanged.

Advantageously, grating elements will be chosen that are dimensioned to be able to pass through a manhole defined in the reactor, in order to simplify these operations.

Even if it is possible to provide localized elements, the assembly means can advantageously comprise assembly elements extending longitudinally, helically or tangentially, so as to ensure the fixing and the sealing of at least a part of an end edge of one or two grating elements.

Advantageously, at least one assembly element can define at least one cavity, for example one or two cavities, to receive at least one corresponding grating element end edge.

When several grating elements of relatively modest dimensions are provided, the assembly means can thus form a support framework for receiving these different grating elements.

The assembly means of the grating element or elements make it possible to ensure a fixing of the grating element or elements on the perforated cylinder that can be dismantled.

The loads induced by differences of expansion between the perforated cylinder and the grating element or elements can be lesser than if this or these grating element(s) were secured to the perforated cylinder by a weld, as in the prior art.

Advantageously and in a nonlimiting manner, the assembly means can be arranged to be able to be installed on the perforated cylinder so as to be able to be dismantled, for example by means of a rod, threaded or not, or the like.

Advantageously, the assembly means can comprise a rod, threaded or not, intended to be introduced into or through a perforated plate of the perforated cylinder.

The assembly means can for example comprise an assembly screw, a set screw or a stud, a bolt, a stud/nut system, a flange or the like.

Advantageously, the wall is arranged such that the rod or rods pass through one or more, respectively, perforation(s) of the perforated plate. The existing perforations are thus exploited to assemble the grating element or elements on the perforated cylinder.

Furthermore, it can be noted that the wall can thus comprise a perforated cylinder that has been installed for a long time, the fixing of the grating elements being compatible with the existing situation.

For example, provision can be made to fix each end of flat to the corresponding perforated plate by means of assembly screws, and to ensure the sealing by sealing plates blocking a passage between the wires and the facing perforated plate. It will also be possible to provide one or more covering plate(s), particularly if the end edges of the grating elements are relatively far apart.

The invention is in no way limited to this feature concerning the dismantlable nature of the fixing between assembly means and perforated plate: it would for example be possible to provide assembly means, for example of spring blade type, welded to the perforated cylinder and bearing on the end edge of a grating element.

Nor is the invention limited by the manner in which the assembly means cooperate with the grating element or elements: it is for example possible to provide assembly means welded to the grating elements, or even installed on the grating element or elements so as to be able to be dismantled.

In one embodiment, it is for example possible to provide for the assembly means to comprise threaded rods passing through orifices defined in respective flats and orifices of the perforated plate in order to fix these flats to the perforated cylinder.

However, the wall can advantageously be arranged so that the assembly means define, possibly with the perforated cylinder or another plate, at least one cavity for receiving at least one portion of at least one grating element end edge. The grating element can thus be kept intact.

The assembly means can thus comprise a retention portion, intended to cover a corresponding portion of grating element end edge, in order for this end edge to be retained under this retention portion, for example inserted between this retention portion and the grating cylinder.

The assembly means can be arranged such that the retention portion exerts a pressure on the corresponding end edge, in order to press said end edge against the perforated cylinder.

The assembly means can for example comprise a spring, for example a blade spring, exerting a pressure on a corresponding flat end and/or on the wires.

The pressure can alternatively be obtained by means of a screw. The retention portion can for example form part of a flange element.

Thus, the assembly means can comprise a flange element defining an orifice for the passage of the rod and a retention portion intended to exert a pressure on the grating element, such that the rod can be installed at a distance from the wires. This flange element can thus allow a fixing without damaging the wires.

Even if the assembly means can comprise several localized elements, each corresponding to one or two ends of flats for example, the assembly means can advantageously comprise an assembly element comprising at least one retention portion and extending tangentially, helically or longitudinally when installed on the wall.

A retention portion can be facing another retention portion, each retention portion corresponding to an end edge of a grating element.

In particular, an assembly element can comprise two facing retention portions, each retention portion corresponding to an end edge of a grating element.

Thus, and in particular when the grating assembly comprises several grating elements, the assembly means can form a support framework receiving the different grating elements.

Alternatively, the flange element can be relatively localized, and in particular be mounted in order to exert a pressure on only one flat end. In this case, it will be possible to provide sealing plates extending longitudinally between two flange elements and/or one or more covering plate(s).

Advantageously, the flange element can define two retention portions, on either side of the orifice, to keep two respective grating element end edges in place.

Advantageously, the flange element can define a retention part sufficiently extended to cover several ends of flats of a grating element end edge.

Advantageously, the flange element can define two retention parts that are sufficiently extended to each cover several ends of flats of a grating element end edge. The flange element can define one or more orifices between these two retention parts, for example as many orifices as there are pairs of ends of flats facing one another. The flange element thus ensures, in addition to a fixing function, a sealing function insofar as the two end edges facing one another are covered. In other words, the sealing means can then comprise the flange element.

The cylindrical wall can for example be a radial flow catalyst bed wall.

The invention can be applied for example in catalytic reformers, in reforming regenerators, in the context of other dehydrogenation transformation methods, and more generally in the context of any method for filtering solid particles in a fluid by means of a cylindrical wall.

The catalyst bed wall can be a center pipe wall, of relatively small diameter compared to the diameter of a section of reactor, or even an outer basket of greater diameter.

Depending on the operating conditions of the unit for which this cylindrical wall is intended, the solid particles can or cannot circulate.

The solid particles, for example the catalyst, can for example take the form of grains with a granule size analysis centered around one or a few millimeter(s). For example, the average size of the catalyst grains (of spherical or extruded form) can vary between 0.5 and 5.0 mm, advantageously between 1 and 3 mm. Since the catalyst is subject to erosion and to attrition, some of the catalyst grains can have a diameter of between 0.7 and 1.0 mm.

The catalyst is intended to be contained in an annular space between two radial flow catalyst bed walls, at least one of which is as described above.

A fluid is intended to circulate radially, for example from the outside of the outermost wall, or outer basket, to the other wall called center pipe wall. The fluid passes through the catalyst bed and is collected in the center pipe. Alternatively, the fluid can flow from the center pipe to the outer basket. The grating assembly and the perforated cylinder allow the passage of the fluid while preventing the catalyst from passing into the center pipe or, if appropriate, out of the outer basket.

The cylindrical wall for filtering solid particles can therefore be designed to filter particles initially outside the cylinder (with the wires on the outside), the fluid entering into the cylinder, or else to filter particles inside the cylinder (with the wires on the inside), the fluid passing from the inside of the cylinder to the outside of the cylinder.

In one embodiment, it is possible to provide an additional perforated cylinder, called containing cylinder, comprising a perforated sheet, called containing sheet. This containing sheet is arranged concentrically between the grating assembly and the perforated cylinder. In effect, since the assembly of the grating elements to form a grating assembly is independent of the perforated cylinder, or dismantlable, it is possible to insert this additional (containing) cylinder between this perforated cylinder and the grating assembly, thus making it possible to increase reliability of the retention of catalyst in the annular space in the case of a mechanical failure of the grating cylinder.

The perforated sheet used for the containing cylinder can define recesses of diameters smaller than those of orifices defined in the perforated cylinder and smaller than the average size of the catalyst grains.

The containing cylinder can advantageously be independent of the grating cylinder.

For example, the containing cylinder can be held in place by the assembly means, for example by the flange element.

Advantageously, the orifices of the containing cylinder can have dimensions in the tangential plane of the order of the distance between two adjacent wires, thus making it possible to reinforce the filtration.

There is a risk of these orifices becoming blocked. However, by virtue of the dismantlable nature of their fixing, the grating elements can be removed, thus making it possible to clean the containing cylinder.

Also proposed is a reactor comprising a radial flow catalyst bed wall as described above.

Also proposed is a catalytic reforming unit comprising a reactor as described above.

The invention will be better understood with reference to the figures, which illustrate embodiments given by way of example and in a nonlimiting manner.

FIG. 1, already described, shows an example of catalytic reformer according to the prior art.

FIG. 2 is a cross-sectional view of a section of a portion of a radial flow catalyst bed center pipe wall according to an embodiment known from the prior art, FIG. 3 is a cross-sectional view of a section of a portion of wall according to an embodiment of the invention, FIG. 4 is a perspective and highly schematic view of a center pipe wall according to the embodiment of FIG. 3, FIG. 5A is a perspective view of a portion of wall according to another embodiment of the invention, FIG. 5B is a cross-sectional view of a section of a portion of wall according to yet another embodiment of the invention, FIG. 6 is a cross-sectional view of a section of a portion of wall according to another embodiment of the invention.

The proportions are not necessarily retained from one figure to another.

On the other hand, references that are identical from one figure to another can be used to denote identical or similar elements.

Referring to FIG. 2, a reforming reactor can comprise an outer basket and a center pipe of which a portion is represented here.

This center pipe comprises a perforated cylinder 3 produced from a perforated sheet secured by its two opposite edges (not visible on the portion represented).

The perforated cylinder 3 extends in a longitudinal direction corresponding to the vector $\vec{z}$.

The center pipe further comprises a grating assembly 10 arranged concentrically relative to the perforated cylinder 3, this grating assembly is formed by the assembly of grating elements comprising flats 2 and wires 1.

The wires 1 extend in the longitudinal direction $\vec{z}$, whereas the flats 2 extend tangentially so as to form circles spaced apart from one another along the longitudinal direction $\vec{z}$.

A weld bead 5 makes it possible to secure the flats 2 to the perforated plate 3 and to secure the flats 2 to one another. This same weld bead 5 extends over all the height of the cylinder.

Referring to FIG. 3, a catalyst bed wall 100 of a center pipe comprises a grating assembly 110 and a perforated cylinder 30 arranged concentrically and extending in a longitudinal direction $\vec{z}$.

The grating assembly 110 is intended to be in contact with a catalyst that is not represented.

Fluid that is not represented is intended to pass through this wall 100 by a substantially radial flow.

The perforated cylinder defines orifices 31 for allowing the fluid to pass. These orifices 31 can have dimensions of the order of a few millimeters (for example between 3 mm and 30 mm).

The catalyst grains can for example have dimensions of the order of a millimeter, for example an average particle diameter between 1.0 and 3.0 millimeters.

The grating assembly 110 makes it possible to ensure the retention of the catalyst in the annular space. This grating is produced from several grating elements 113, each grating element 113 comprising flats 20 extending tangentially and spaced apart from one another in the longitudinal direction $\vec{z}$.

Each grating element 113 further comprises wires 111, here of triangular section, secured to the flats 20.

Since the space between two adjacent wires is relatively restricted (less than the average diameter of the particles of the catalyst), the grating assembly 110 participates in the retention of the catalyst and does so despite the passage of the fluid through the wall 100.

Assembly means ensure a dismantlable fixing of the grating elements 113 on the perforated cylinder 30.

As can be seen in FIG. 4, several grating elements 113 are provided for one and the same given cylinder height, each grating element corresponding to a given angular range, for example between 60° and 90°. Furthermore, each grating element occupies only a portion of the height of the cylinder. The grating elements 113 can thus be of relatively small dimensions, and in particular pass through a manhole.

The assembly means comprise assembly elements, each assembly element comprising a flange element 120, threaded rods 101 and nuts 102, 104. The assembly elements have an elongate form, so as to cover all of a grating element end edge, here two edges per assembly element. The assembly elements thus form a support framework for the grating elements.

Each flange element defines orifices for the passage of threaded rods 101, and retention portions 103, 103' covering corresponding grating element 113 end edges.

In this example, the retention portions extend tangentially or longitudinally, so as to cover at least a part, and advantageously all, of the corresponding end edges.

The flange element 120 comprises two retention portions 103, 103', for two end edges of two respective adjacent grating elements.

These retention portions covering the end edges and the space between these end edges, the flange element 120 incorporates sealing means blocking, on the corresponding end edges, flow passages between the corresponding grating elements and the perforated cylinder.

The threaded rods 101 pass through the orifices 31' of the perforated plate 30.

Nuts 102, 104 make it possible to rigidly and dismantlably fix the flange element to the perforated plate 30.

In this example, the flange element 120 defines recesses 105 on its upper part, in order to receive one 104 of these nuts. The nuts 104 can thus, when screwed, be flush with the surface of the flange elements 120.

When the nuts 102, 104 are sufficiently tightened, the retention portions 103, 103' exert a pressure on the end edges of the corresponding grating elements, thus pressing these end edges of the grating 113 against the perforated cylinder.

As emerges from FIG. 3, the flange element defines, with the perforated plate 30 (or, if appropriate, the containing cylinder), two cavities for receiving the two end edges of the two corresponding grating elements. The grating elements 113 can thus be assembled to form a grating cylinder without modification of the grating elements themselves.

As emerges from FIG. 4, the assembly means for these grating elements 113 thus form a kind of support framework, allowing a rigid but dismantlable assembly of the different grating elements 113.

In the embodiments of FIGS. 5A and 5B, elements are also provided that are dedicated to sealing, here plates 50 and, in the variant of FIG. 5B, 50 and 50', extending longitudinally over all the length of the grating cylinder.

Referring to FIG. 5A, these plates 50 are arranged in proximity to the ends of the flats 20, on the edge of the grating element.

These plates 50 define recesses for receiving ends of the flats 20.

Referring to FIG. 5B, additional plates 50' are provided, in addition to the plates 50 at the edges of the grating elements.

The additional plate 50' is parallel or substantially parallel to the plate 50, and is separated from this plate 50 by a length slightly greater than the width of a wire 111.

The sealing means thus have a structure with a double thickness, thus ensuring a reinforced sealing.

In the embodiment of FIG. 6, the wall 100 further comprises an additional perforated sheet 140 forming an additional perforated cylinder.

This additional perforated cylinder is interposed between the perforated cylinder 30 and the grating assembly 110. The additional perforated sheet defines orifices 61 of much smaller sections than the orifices 31 of the perforated cylinder 30, thus allowing the retention of the catalyst in the case of a mechanical failure of the grating cylinder.

This additional perforated sheet 140 is kept in place by the flange element 120, thus ensuring an independent fixing of the perforated cylinder and of the grating 110, thus making it possible to limit the sensitivity to changes of temperature.

The invention claimed is:

1. A cylindrical wall for filtering solid particles in a fluid, through which this fluid is likely to circulate, this wall comprising:
    a perforated cylinder extending in a longitudinal direction, the cylinder being produced from at least one perforated plate,
    a grating assembly, of generally cylindrical form, intended to be in contact with the solid particles, the grating assembly and the perforated cylinder being concentric, the grating assembly comprising at least one grating element, the grating element comprising a plurality of wires each extending in the longitudinal direction, and
    means for assembling the at least one grating element so as to form the grating assembly of generally cylindrical form, the assembly means being arranged to ensure fixing of the at least one grating element on the perforated plate that can be dismantled.

2. The wall as claimed in claim 1, wherein the assembly means are arranged to be able to be themselves installed on the perforated cylinder so as to be able to be dismantled.

3. The wall as claimed in claim 2, wherein the assembly means comprise a rod intended to be introduced into or through a perforated plate of the perforated cylinder.

4. The wall as claimed in claim 1, wherein the assembly means being arranged to ensure a dismantlable fixing of at least one grating element on the perforated cylinder, the assembly means defining at least one cavity to receive at least a portion of at least one grating element end edge.

5. The wall as claimed in claim 4, wherein the assembly means comprise at least one retention portion intended to cover the end edge of the grating element received in the corresponding cavity, characterized in that the assembly means are arranged so that the retention portion exerts a pressure against the end edge in order to press the end edge against the perforated cylinder.

6. The wall as claimed in claim 3, wherein the assembly means comprises a flange element comprising the retention portion and defining an orifice for the passage of the rod.

7. The wall as claimed in claim 1, wherein the grating assembly comprises a plurality of grating elements, characterized in that each grating element extends tangentially so as to occupy an angular range strictly less than 360°.

8. The wall as claimed in claim 1, further comprising an additional perforated cylinder comprising a perforated sheet, the additional perforated cylinder being arranged concentrically between the grating assembly and the perforated cylinder.

9. The wall as claimed in claim 1, further comprising sealing means arranged to block, on an end edge of at least one grating element, a flow passage between this grating element and the perforated plate.

10. The wall as claimed in claim 1, the wall being a radial flow catalyst bed wall.

11. A reactor comprising a radial flow catalyst bed wall as claimed in claim 10.

12. A catalytic reforming unit comprising a reactor as claimed in claim 11.

13. The catalytic reforming unit as claimed in claim 12, wherein the radial flow catalytic bed wall as claimed in claim 11 is a center pipe wall.

* * * * *